(12) United States Patent
Chou

(10) Patent No.: US 8,557,348 B2
(45) Date of Patent: Oct. 15, 2013

(54) METHOD OF MANUFACTURING A SYNTHETIC LEATHER FORMED WITH A PATTERN

(76) Inventor: Lung-Wen Chou, Longjing Township, Taichung County (TW)

( * ) Notice: Subject to any disclaimer, the term of this patent is extended or adjusted under 35 U.S.C. 154(b) by 1048 days.

(21) Appl. No.: 12/400,018

(22) Filed: Mar. 9, 2009

(65) Prior Publication Data

US 2010/0225019 A1 Sep. 9, 2010

(51) Int. Cl.
*B05D 7/12* (2006.01)

(52) U.S. Cl.
USPC ........... 427/412; 427/331; 427/359; 427/402; 427/407.1

(58) Field of Classification Search
USPC ............ 8/478; 427/402, 407.1, 412, 331, 359
See application file for complete search history.

(56) References Cited

U.S. PATENT DOCUMENTS

| | | | | |
|---|---|---|---|---|
| 4,539,056 A | * | 9/1985 | Takeshita et al. | 156/183 |
| 6,759,354 B1 | * | 7/2004 | Smith et al. | 442/118 |
| 6,764,564 B2 | * | 7/2004 | Chou | 156/78 |

* cited by examiner

*Primary Examiner* — Mark Kopec
*Assistant Examiner* — Haidung Nguyen
(74) *Attorney, Agent, or Firm* — Ming Chow; Sinorica, LLC

(57) ABSTRACT

A method of manufacturing a synthetic leather formed with a pattern includes a mixing step (A) in which at least a first material and a second material are properly mixed in proportion into a mixture; a first coating step (B) in which the mixture is coated on a substrate to form a blocking layer; a printing step (C) in which a determined pattern is printed on the surface of blocking layer to form a pattern layer; and a second coating step (D) in which at least the mixture is coated on the pattern layer to form a surface layer, thereby a product being finished. Thus, the pattern layer may be sandwiched between the blocking layer and the surface layer, which prevents the pattern layer contacting the substrate or outside from fading in color and shedding off and prevents the child from eating, by accident, the fall-off pattern layer.

11 Claims, 4 Drawing Sheets

METHOD OF MANUFACTURING A SYNTHETIC LEATHER FORMED WITH A PATTERN

BACKGROUND OF THE INVENTION

1. Field of the Invention

This invention relates to a method of manufacturing a synthetic leather formed with a pattern.

2. Description of the Prior Art

A conventional synthetic leather is extensively used in various fields, and the appearance of the synthetic leather is optionally various. In order to satisfy all consumer groups, the synthetic leather is formed with a pattern in the technology of printing for enhancement of observability.

However, in the technology of printing, the pattern is generally printed on the substrate or surface of the synthetic leather. When the pattern is printed on the surface of substrate, the substrate absorbs coloring materials and fades in color and is not vivid in color after being used for a long time. Besides, when the pattern is printed on the surface of synthetic leather, because the surface of synthetic leather is exposed to a space contacting the outside for a long time, a print-off issue might be caused. When there is a child home, the child licks or puts the print in his or her mouth, which might cause the child to eat the peel-off print by accident and then endanger the child in health. Thus, improvement of the conventional method of manufacturing the synthetic leather is necessarily made.

Consequently, because of the technical defects of described above, the applicant keeps on carving unflaggingly through wholehearted experience and research to develop the present invention, which can effectively improve the defects described above.

SUMMARY OF THE INVENTION

A method of manufacturing a synthetic leather formed with a pattern according to this invention comprises a mixing step (A) in which at least a first material and a second material are properly mixed in proportion into a mixture; a first coating step (B) in which the mixture is coated on a substrate to form a blocking layer; a printing step (C) in which a determined pattern is printed on the surface of blocking layer to form a pattern layer; and a second coating step (D) in which at least the mixture is coated on the pattern layer to form a surface layer, thereby a product being finished. Thus, the pattern layer may be sandwiched between the blocking layer and the surface layer, which prevents the pattern layer contacting the substrate or outside from fading in color and shedding off and prevents the child from eating, by accident, the fall-off pattern layer.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
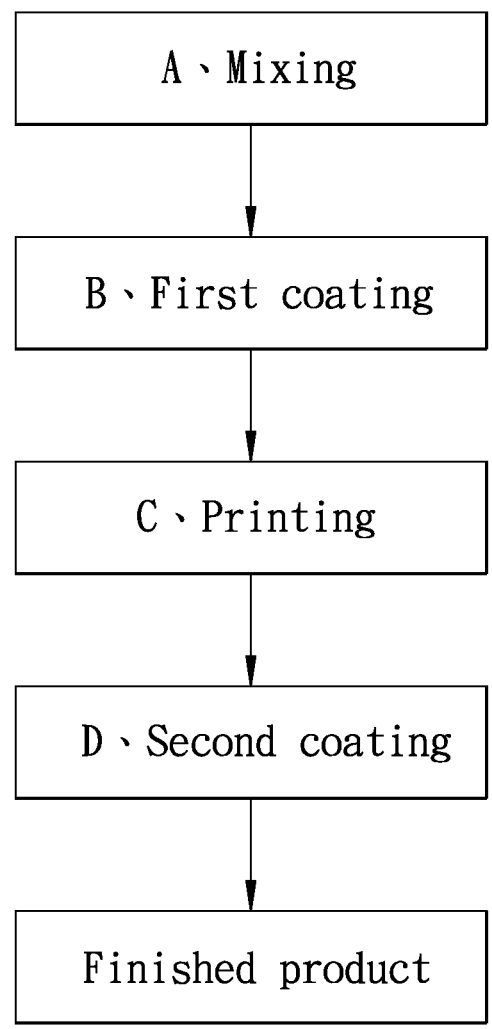
FIG. 1 is a flow chart of a method of manufacturing a synthetic leather according to this invention.
Figure 2:
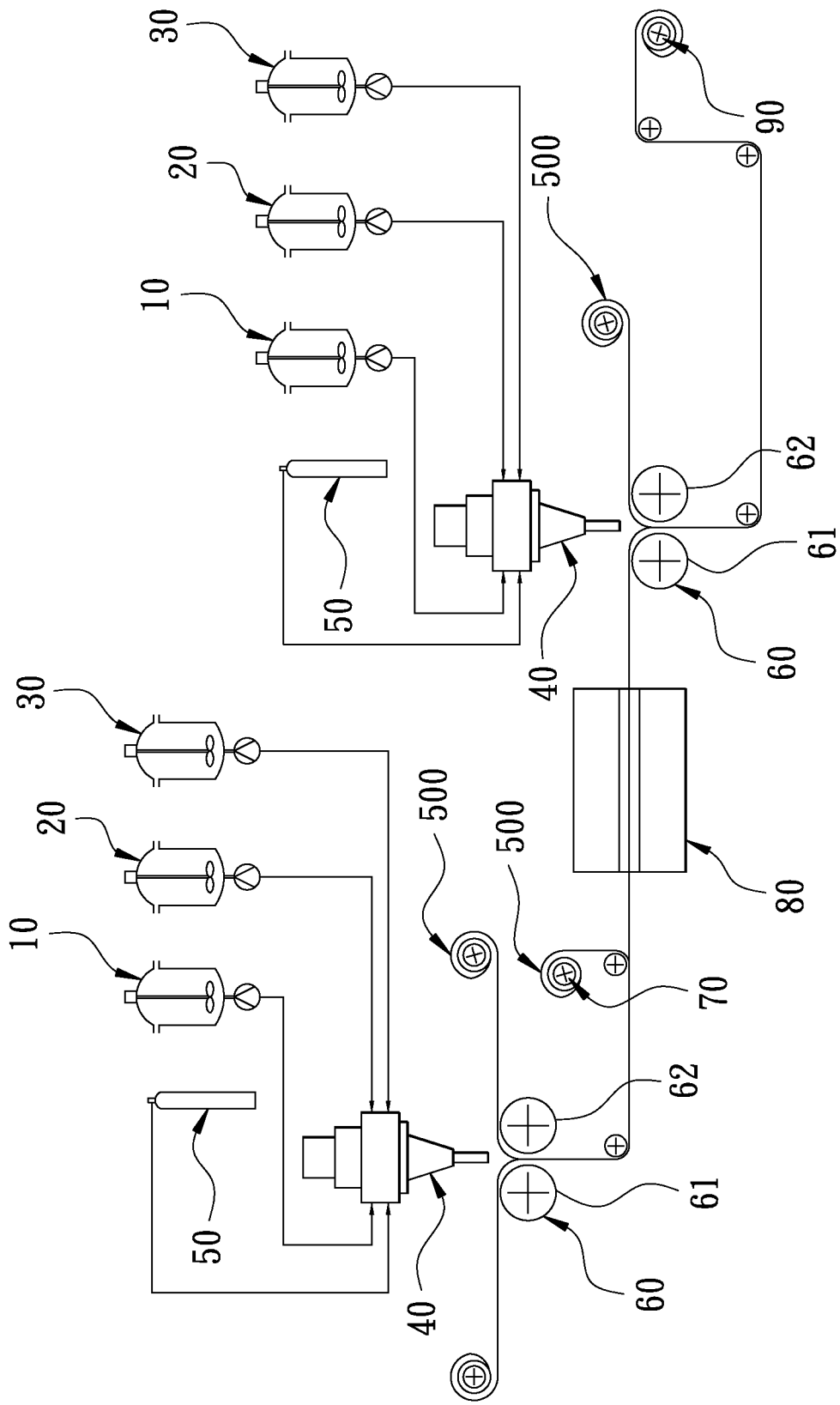
FIG. 2 is a schematic view illustrating the method of manufacturing the synthetic leather according to this invention.
Figure 3:
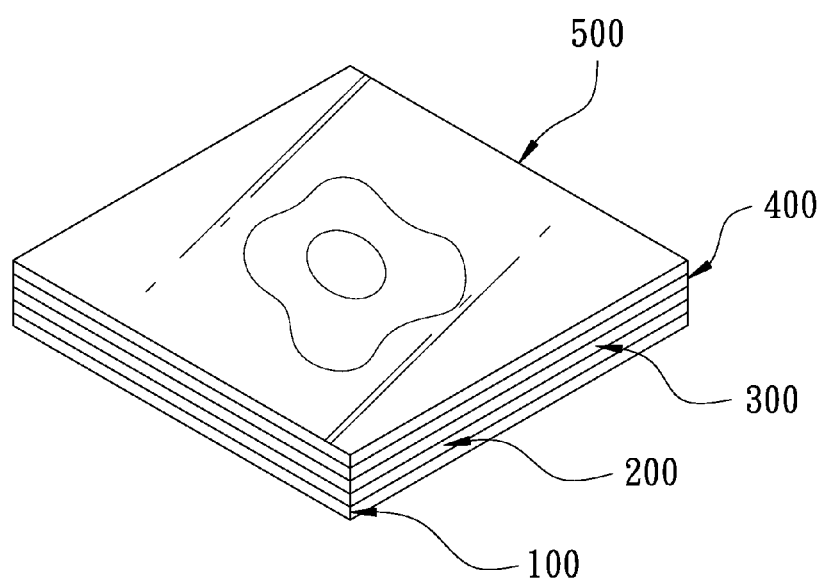
FIG. 3 is a 3D view of a finished synthetic leather product according to this invention.
Figure 4:
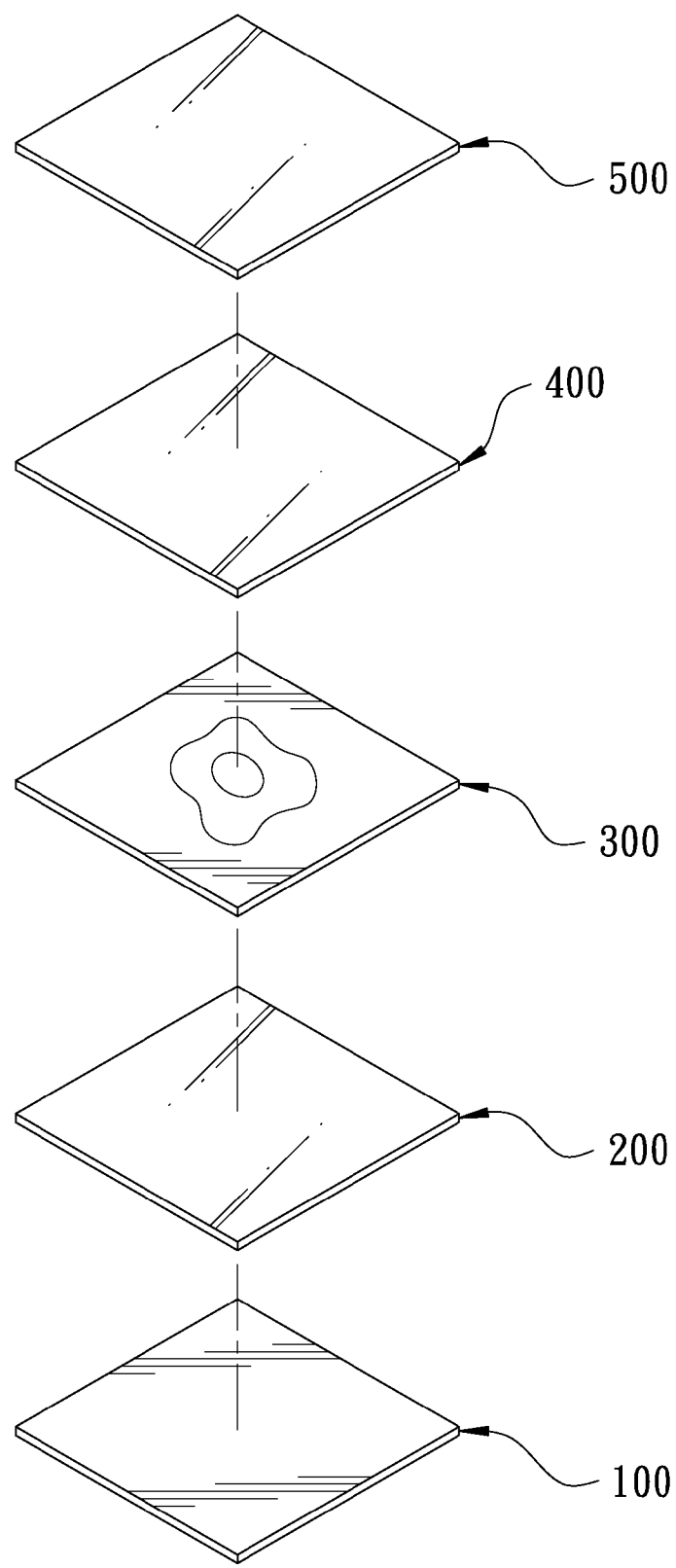
FIG. 4 is an exploded view of the finished synthetic leather product according to this invention.

Firstly, with reference to FIGS. 1 through 4, a method of manufacturing a synthetic leather formed with a pattern comprises steps of mixing, first coating, printing, and second coating.

A. Mixing: A first material of isocyanate polymer containing NCO, a second material of hydroxy compound containing OH are mixed into a first mixture, and a third material with a determined color are respectively placed in a first metric output device 10, a second metric output device 20, and a third metric output device 30 and then filled into an injection mixing device 40. The injection mixing device 40 is further linked with a bubbling device 50 containing a bubbling material, and the materials are evenly mixed into a mixture. The mixture is a material of TPU (Thermoplastic Polyurethane).

B. First coating: The mixture falls of itself into the surface of a substrate 100 from the injection material mixing device 40, in which the substrate 100 is a cloth material or a plastic material. Further, a pressing device 60 is used to press and mold the substrate 100 and the mixture in a determined shape and thickness. The pressing device 60 is located under the injection mixing device 40 and comprises a first roller 61 and a second roller 62 that are parallel with each other. The first roller 61 may roll the substrate 100, while the second roller 62 rolls a release paper 500 and drives the substrate 100 and the release paper 500 to run toward the first roller 61 and the second roller 62 at the same time, and transmits downwards. Further, a blocking layer 200 is formed on the substrate 100. The release paper 500 keeps close to the blocking layer 200. The release paper 500 is used to keep the surface of blocking layer 200 level up. Still, the second roller 62 may be used for assistance to control the thickness of mixture on the substrate 100.

C. Printing: A first rewinding roller 70 is used to roll the release paper 500 kept close at the step of first coating (B) out of the blocking layer 200, and a determined pattern is printed by a printing device 80 on the surface of blocking layer 200 to form a pattern layer 300. The method of printing comprises dye sublimation, spray, transfer, or screen printing.

D. Second coating: the mixture is infused downwards onto the substrate 100 processed at the step of printing (C) and the substrate 100 is pressed by the first roller 61 and the second roller 62 to form a surface layer 400 on the pattern layer 300, thereby a product being finished. Still, at the time of press fit through the first roller 61 and the second roller 62, the release paper 500 is rolled by the second roller 62 and thus is kept close to the surface of surface layer 400 and may be torn off for use, and the release paper 500 protects the surface of surface layer 400 from being scratched or stained with foreign matters. Further, the finished product is delivered to a second rewinding roller 90 to be rolled.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of manufacturing a synthetic leather formed with a pattern, comprising steps of:
   mixing (A) in which a first material, a second material, a third material, and a bubbling material are evenly mixed into a mixture,
   wherein the first material and the second material are separately arranged in a first metric output device and a second metric output device and further infused from the first metric output device and the second metric output device into an injection mixing device to be mixed;
   first coating (B) in which the mixture is coated on a substrate to form a blocking layer,
   wherein a release paper is kept adjacent to the blocking layer;
   printing (C) in which a determined pattern is printed on the surface of blocking layer to form a pattern layer,
   wherein the printing comprises of print methods selected from the group consisting of dye sublimation printing, spray printing, transfer printing, and screen printing; and
   second coating (D) in which the mixture is coated on the pattern layer to form a surface layer, thereby forming a finished product with the substrate, the blocking layer, the pattern layer, and the surface layer,
   wherein the finished product is rolled by a second rewinding roller.

2. The method of manufacturing the synthetic leather formed with the pattern according to claim 1, wherein the first material is a material of isocyanate polymer containing NCO.

3. The method of manufacturing the synthetic leather formed with the pattern according to claim 1, wherein the second material is a material of hydroxy compound containing OH.

4. The method of manufacturing the synthetic leather formed with the pattern according to claim 1, wherein the third material is a material of a determined color.

5. The method of manufacturing the synthetic leather formed with the pattern according to claim 1, wherein the mixture is a material of TPU (Thermoplastic Polyurethane).

6. The method of manufacturing the synthetic leather formed with the pattern according to claim 1, wherein in the step of mixing (A), the bubbling material is further added to accelerate bubbling.

7. The method of manufacturing the synthetic leather formed with the pattern according to claim 1, wherein the substrate is a cloth material.

8. The method of manufacturing the synthetic leather formed with the pattern according to claim 1, wherein the substrate is a plastic material.

9. The method of manufacturing the synthetic leather formed with the pattern according to claim 1, wherein the release paper pasted in the step of first coating (B) is torn off by a first rewinding roller and the blocking layer is further processed for printing.

10. The method of manufacturing the synthetic leather formed with the pattern according to claim 1, wherein in the step of second coating (D), a release paper is further kept adjacent to the surface layer.

11. The method of manufacturing the synthetic leather formed with the pattern according to claim 1, wherein in the step of first coating (B), the mixture falls onto the surface of substrate from the injection material mixing device and a pressing device is used to press and mold the substrate and the mixture in a determined shape and thickness.

* * * * *